(12) United States Patent
Uchiyama et al.

(10) Patent No.: US 10,400,809 B2
(45) Date of Patent: Sep. 3, 2019

(54) STRUCTURE, MANUFACTURING METHOD THEREFOR, AND FASTENER

(71) Applicant: LENOVO (SINGAPORE) PTE. LTD., Singapore (SG)

(72) Inventors: Yoshiharu Uchiyama, Yokohama (JP); Takayuki Morino, Yokohama (JP); Toshihiro Inoue, Yokohama (JP); Sara Akiyama, Yokohama (JP); Shigehiro Horiuchi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 137 days.

(21) Appl. No.: 15/666,036

(22) Filed: Aug. 1, 2017

(65) Prior Publication Data
US 2018/0073544 A1  Mar. 15, 2018

(30) Foreign Application Priority Data
Sep. 13, 2016  (JP) .................................. 2016-178874

(51) Int. Cl.
| F16B 33/02 | (2006.01) |
| F16B 41/00 | (2006.01) |
| F16B 5/02  | (2006.01) |
| F16B 5/06  | (2006.01) |

(52) U.S. Cl.
CPC ............ *F16B 33/02* (2013.01); *F16B 5/0275* (2013.01); *F16B 41/002* (2013.01); *F16B 5/065* (2013.01); *F16B 2033/025* (2013.01)

(58) Field of Classification Search
CPC . F16B 41/002; F16B 2033/025; F16B 5/0275

USPC ................... 411/412, 413, 999, 353
See application file for complete search history.

(56) References Cited

U.S. PATENT DOCUMENTS

| 824,382 | A | * | 6/1906 | Quitman | ............... F16B 41/002 411/107 |
| 3,093,025 | A | * | 6/1963 | Wasserman | ........... F16B 35/041 292/212 |
| 3,124,031 | A | * | 3/1964 | Knohl | ................... F16B 5/0275 411/418 |
| 3,390,904 | A | * | 7/1968 | Jonelis | .................. F16B 35/048 403/320 |

(Continued)

FOREIGN PATENT DOCUMENTS

JP    2007187215 A    7/2007

*Primary Examiner* — Flemming Saether
(74) *Attorney, Agent, or Firm* — Shimokaji IP

(57) ABSTRACT

The present invention provides a structure for omitting washers to reduce the number of parts, and keeping the fitting of two members fastened together even when the washers are omitted. The structure includes: a first member having a first screw hole; a second member facing the first member, having a second screw hole larger than the first screw hole, and threaded in a direction opposite to the first screw hole; and a fastener. The fastener includes, along a longitudinal direction: a first screw section having a diameter corresponding to the first screw hole; a second screw section between the first member and the second member, having a diameter corresponding to the second screw hole, and threaded in a direction opposite to the first screw section; a neck at least partially located in the second screw hole; and a head larger in the longitudinal direction than the second screw hole.

8 Claims, 4 Drawing Sheets

(56) References Cited

U.S. PATENT DOCUMENTS

| | | | | |
|---|---|---|---|---|
| 3,418,013 A | * | 12/1968 | Kelly | F16B 33/02 403/22 |
| 6,042,314 A | * | 3/2000 | Guelck | F16B 25/0031 29/525.11 |
| 6,125,526 A | * | 10/2000 | Wierzchon | F16B 5/0275 29/525.02 |
| 7,213,999 B2 | * | 5/2007 | Haas | F16B 5/0275 403/337 |
| 2009/0003969 A1 | * | 1/2009 | Gattone | F16B 21/08 411/413 |

* cited by examiner

STRUCTURE, MANUFACTURING METHOD THEREFOR, AND FASTENER

FIELD OF THE INVENTION

The present invention relates to a structure, a manufacturing method therefor, and a fastener.

BACKGROUND OF THE INVENTION

When two members are fastened together by a fastening member such as a screw or a bolt, a washer is generally used to prevent fastening looseness (e.g., see Patent Document 1). For example, in an electronic apparatus such as a laptop PC, sets of screws and washers are used to mount a bottom cover on a device chassis with a memory and the like internally arranged.

[Patent Document 1] Japanese Patent Application Laid-Open No. 2007-187215

SUMMARY OF THE INVENTION

However, in such an electronic apparatus, since the bottom cover is generally mounted at plural mounting positions, the total number of screws and washers is large and it is cumbersome to attach and manage these parts. Further, some consumers open the bottom cover to change the memory or the like. In doing so, there is concern about losing screws and washers, and forgetting to attach washers.

Therefore, it is an object of the present invention to provide a structure, a manufacturing method therefor, and a fastener, capable of omitting washers to reduce the number of parts, and keeping the fitting of two members after being fastened together even when the washers are omitted.

In order to attain the above object, a structure according to one aspect of the present invention includes: a first member having a first screw hole; a second member facing the first member and having a second screw hole larger in diameter than the first screw hole and threaded in a direction opposite to the first screw hole; and a fastener, wherein the fastener includes, along a longitudinal direction: a first screw section having a diameter corresponding to the first screw hole to be fastened to the first screw hole; a second screw section located between the first member and the second member and having a diameter corresponding to the second screw hole and threaded in a direction opposite to the first screw section; a neck at least part of which is located in the second screw hole; and a head formed larger than the second screw hole as seen from the longitudinal direction.

A manufacturing method for a structure according to one aspect of the present invention is a method of manufacturing a structure including: a first member having a first screw hole; a second member facing the first member and having a second screw hole larger in diameter than the first screw hole and threaded in a direction opposite to the first screw hole; and a fastener including, along a longitudinal direction, a first screw section having a diameter corresponding to the first screw hole, a second screw section having a diameter corresponding to the second screw hole and threaded in a direction opposite to the first screw section, a neck formed smaller than the second screw hole as seen from the longitudinal direction, and a head formed larger than the second screw hole as seen from the longitudinal direction, the method including: using the head turned in a first direction to insert the second screw section into the second screw hole so as to go out of the second screw hole in order to locate at least part of the neck in the second screw hole; and using the head turned in a direction opposite to the first direction to insert the first screw section into the first screw hole so as to fasten the first screw section to the first screw hole.

A fastener according to one aspect of the present invention is a fastener which fastens a first member and a second member together, where the first member has a first screw hole, and the second member faces the first member and has a second screw hole larger in diameter than the first screw hole and threaded in a direction opposite to the first screw hole, the fastener including, along a longitudinal direction: a first screw section having a diameter corresponding to the first screw hole; a second screw section having a diameter corresponding to the second screw hole and threaded in a direction opposite to the first screw section, the second screw section being located between the first member and the second member when the first member and the second member are fastened together; a neck at least part of which is located in the second screw hole when the first member and the second member are fastened together; and a head formed larger than the second screw hole as seen from the longitudinal direction.

According to the above-described aspects of the present invention, in a state where the first member and the second member are fastened together by the fastener, the first screw section of the fastener is fastened to the first screw hole of the first member, the second screw section of the fastener is located between the first member and the second member, and at least part of the neck of the fastener is located in the second screw hole of the second member. In this state, even if a turning force in a direction to come off acts on the first screw section of the fastener to cause the fastener to rotate in the direction so that the second screw section of the fastener will reach the position of the second screw hole, the second screw section will not be screwed with the second screw hole since the second screw section is threaded in the direction opposite to the first screw section, and this inhibits the fastener from further rotating. In other words, the fastener is retained not to come off the first member and the second member. On the contrary, even if a turning force in a fastening direction acts on the first screw section of the fastener, the first screw section will be further fastened to the first screw hole. Therefore, the fastening state by the fastener is maintained. Thus, the fitting of the first member and the second member after being fastened together can be kept without using any washer in the conventional manner.

In addition, since the head of the fastener is formed larger than the second screw hole of the second member as seen from the longitudinal direction, the overall fastener can be inhibited from dropping off the second screw hole during work such as fitting.

Here, the state where the first member and the second member are fastened together by the fastener means a state where the first member and the second member are not to come off each other by the fastener as a result of the application of the fastener to the first member and the second member. This state also includes a state where the second member is not directly fastened by the fastener (for example, a state where the first member and the second member are fitted to each other in another position, and the fastener serves to prevent the first member and the second member from coming off each other).

According to the above-described aspects of the present invention, there can be provided a structure, a manufacturing method therefor, and a fastener, capable of omitting washers to reduce the number of parts, and keeping the fitting of two members after being fastened together even when the washers are omitted.

DETAILED DESCRIPTION OF THE INVENTION

An example in which a structure according to a preferred embodiment of the present invention is applied to an electronic apparatus such as a laptop personal computer will be described with reference to the accompanying drawings.

Figure 1:
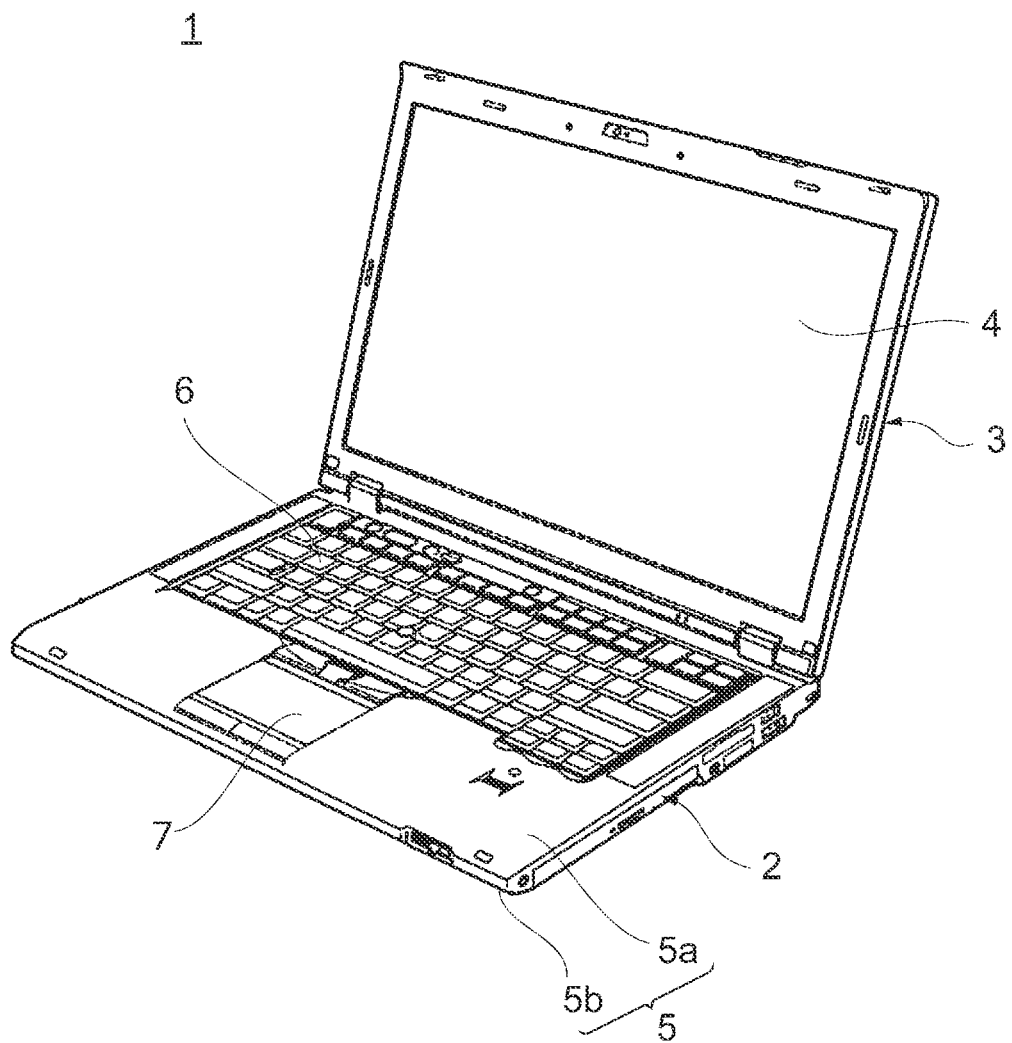
FIG. 1 is a perspective view illustrating an electronic apparatus including a structure according to an embodiment.

As illustrated in FIG. 1, an electronic apparatus 1 includes a main body 2 and a lid body 3 hinged on the rear ends of the main body 2 in a manner to be openable and closable relative to the main body 2. On the side of the lid body 3 to face the main body 2, for example, a liquid crystal display 4 that displays various pieces of information is provided. The main body 2 has a flat box-shaped device chassis 5 composed of an upper cover 5a and a lower cover 5b, and inside the device chassis 5, storage devices such as any of various types of memories and an HDD are housed in addition to a substrate, a CPU, an SDD, a battery, and the like, not illustrated. Further, input units such as a keyboard 6 and a touch pad 7 are provided on the surface of the upper cover 5a.

Figure 2:
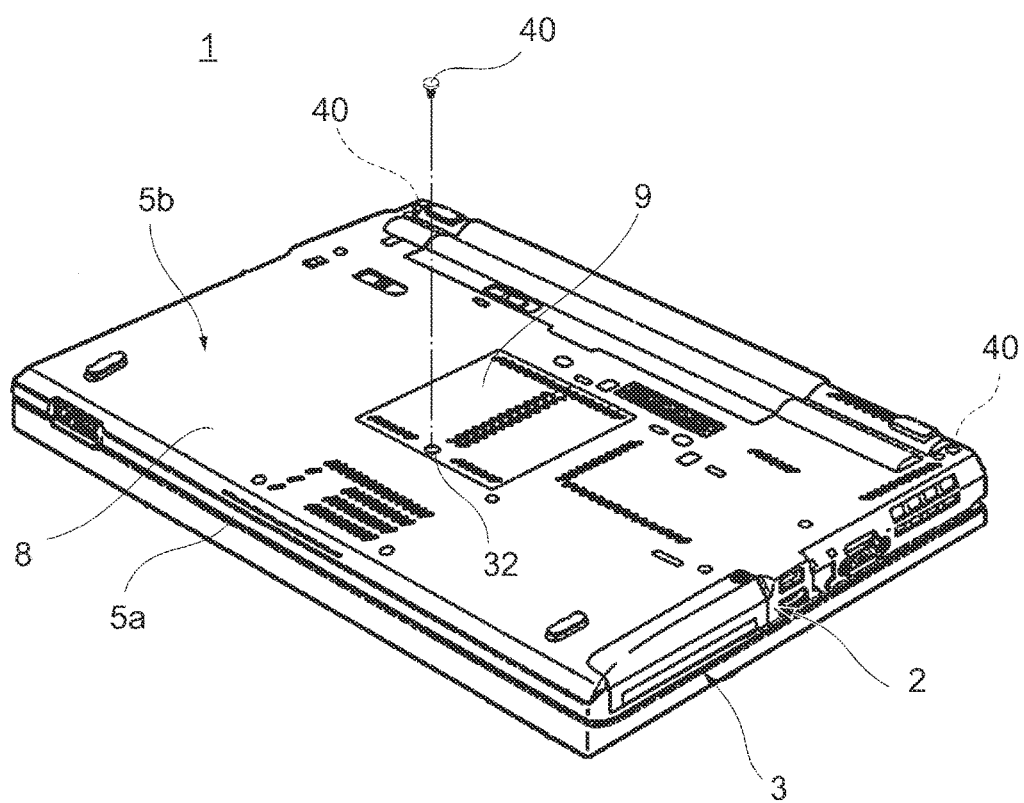
FIG. 2 is a perspective view of the electronic apparatus in FIG. 1 with a lid body closed as seen from the bottom side.

As illustrated in FIG. 2, the lower cover 5b has a bottom cover 8 as a wide bottom face of the device chassis 5, and a battery cover 9 that covers a battery inside the device chassis 5. The bottom cover 8 and the battery cover 9 are thin panel-like members made of metal or resin to be retained by fasteners 40 at predetermined places on the bottom face of the upper cover 5a. For example, when the battery cover 9 is fitted, the battery cover 9 is first slid on the bottom face of the upper cover 5a and attached in a predetermined position of the bottom face of the upper cover 5a, and the fastener 40 loaded in a fitting portion 32 of the battery cover 9 is then used to prevent the battery cover 9 from coming off the upper cover 5a.

Note that only the bottom cover 8 alone may be used as the lower cover 5b of the device chassis 5 without using the battery cover 9 separately, or a dedicated cover for any other internal part may be used. Further, the number of arranged fasteners 40 and the arranged positions of the fasteners 40 used to fit such a cover to the bottom face of the upper cover 5a are optional.

Referring next to FIG. 3, the structure according to the embodiment will be described in detail. A structure 10 includes a first cover 20, a second cover 30, and a fastener 40. The first cover 20 corresponds to the upper cover 5a mentioned above, and the second cover 30 corresponds to the lower cover 5b (the bottom cover 8 or the battery cover 9) mentioned above.

The first cover 20 (first member) has a fitting portion 22 for the fastener 40. The fitting portion 22 is formed to be raised from a surface 24 of the first cover 20 on the side of the second cover 30 toward the second cover 30. In the fitting portion 22, a screw hole 26 (first screw hole) is formed. A female screw 28 is formed on an inner peripheral face of the fitting portion 22 to define the screw hole 26.

The second cover 30 (second member) has a fitting portion 32 for the fastener 40. The fitting portion 32 is formed in the second cover 30 as a stepped through-hole. Specifically, the fitting portion 32 has a counterbore 34 and a screw hole 36 (second screw hole) smaller in diameter than the counterbore 34. A female screw 38 is formed on an inner peripheral face of the fitting portion 32 to define the screw hole 36. The counterbore 34 has such a height that a head 48 of the fastener 40 engaged in the counterbore 34 will not bulge from the external surface of the second cover 30. The counterbore 34 is defined by a peripheral wall 37 and a bottom wall 39 leading to one end of the peripheral wall 37 in the height direction.

Here, the screw hole 36 of the second cover 30 is threaded to be larger in diameter than the screw hole 26 of the first cover 20 in a direction opposite to the screw hole 26. In other words, the female screw 38 of the second cover 30 is larger in effective diameter than the female screw 28 of the first cover 20, and has the shape of a conical helix extending in a direction opposite to the conical helix of the female screw 28. In the embodiment, the female screw 28 is set as a right-handed screw and the female screw 38 is set as a left-handed screw. When the first cover 20 and the second cover 30 are fastened together by the fastener 40, the first cover 20 and the second cover 30 are set to face each other, and the two female screws 28, 38 are coaxially arranged.

The fastener 40 has a first screw section 42, a second screw section 44 larger in diameter than the first screw section 42, a neck 46 smaller in diameter than the second screw section 44, and the head 48 larger in diameter than the neck 46 in this order along a longitudinal direction. This longitudinal direction means the same direction as the axial direction of the first screw section 42 and the second screw section 44. The first screw section 42 is formed coaxially with the second screw section 44 and longer than the second screw section 44 in the axial direction.

The first screw section 42 and the second screw section 44 are formed into respective shapes corresponding to the screw holes 26, 36, that is, in terms of the diameter size, the length in the axial direction, and the threading direction. Specifically, the first screw section 42 is a section of a right-handed male screw capable of being threadedly engaged with the female screw 28 of the first cover 20. The second screw section 44 is a section of a left-handed male screw capable of being threadedly engaged with the female screw 38 of the second cover 30.

The neck 46 is a shaft-like portion formed coaxially with the second screw section 44 to connect the second screw section 44 with the head 48. Further, the neck 46 is formed smaller than the screw hole 36 of the second cover 30 as seen from the longitudinal direction. On the other hand, the head 48 is formed larger than the screw hole 36 of the second cover 30 as seen from the longitudinal direction. Though not illustrated, for example, a cross-like screw recess is formed in a top face 49 of the head 48 to allow the tip of a screwdriver to be engaged with this screw recess and rotated to rotate the fastener 40 around the longitudinal direction as a center.

Figure 3A:
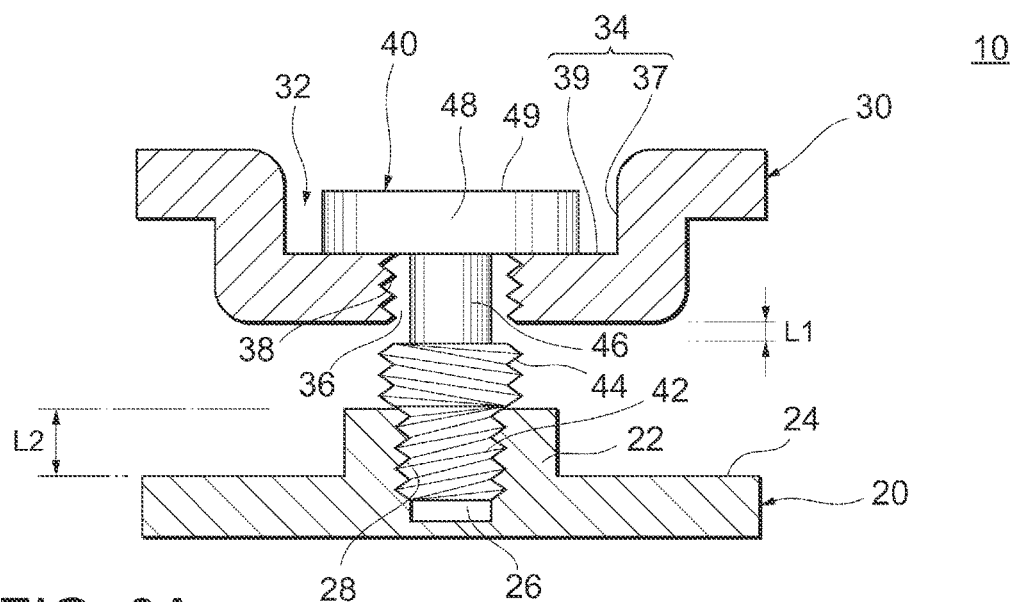
FIG. 3A are enlarged cross-sectional views schematically illustrating the vicinity of a fastener in the structure of FIG. 1, where two members are fastened together by a fastener.

As illustrated in FIG. 3A, the first screw section 42 is screwed with and fastened to the screw hole 26 in a state where the first cover 20 and the second cover 30 are fastened together by the fastener 40, and the second screw section 44 is located between the first cover 20 and the second cover 30. In this state, at least part of the neck 46 is located in the screw hole 36, and the head 48 is located in the counterbore 34. Distance L1 between the second screw section 44 and the screw hole 36 in the longitudinal direction in this state is set shorter than a length L2 of the first screw section 42 in the longitudinal direction. Note that the overall neck 46 may be located in the screw hole 36 in this state. In this case, the distance L1 mentioned above becomes zero. Although the head 48 is in contact with the bottom wall 39 of the counterbore 34 in FIG. 3A, the head 48 may be spaced apart from the bottom wall 39 unless the head 48 projects outward from the counterbore 34.

Figure 3B:
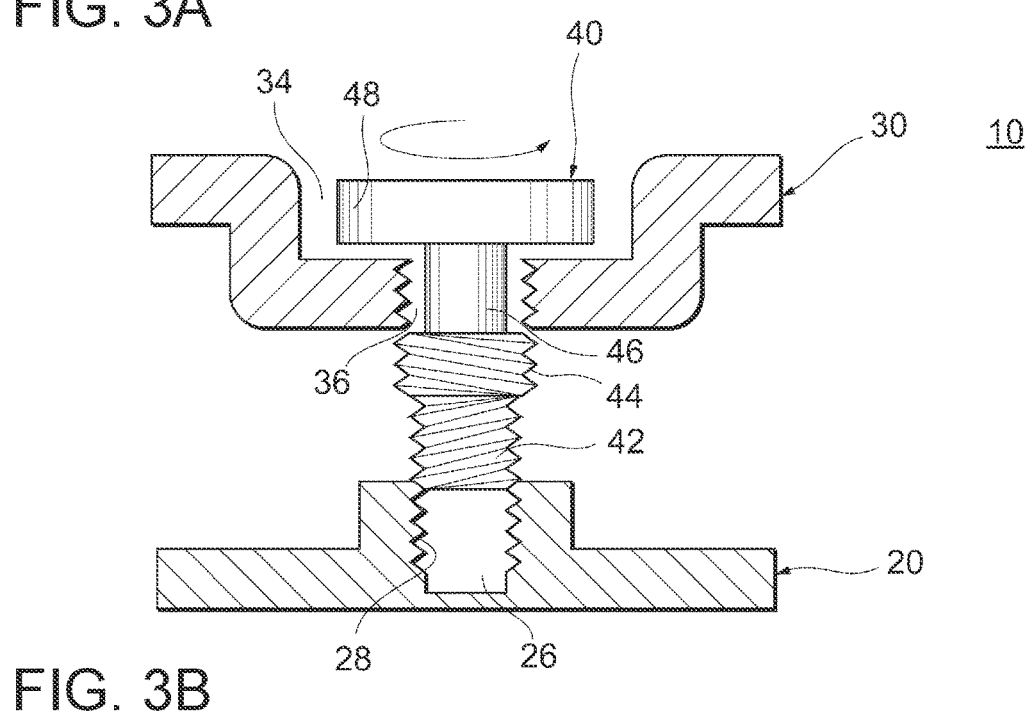
FIG. 3B are enlarged cross-sectional views schematically illustrating the vicinity of a fastener in the structure of FIG. 1, where the fastener is disengaged from the first member.

As illustrated in FIG. 3B, when the fastener 40 is unscrewed, the fastener 40 is first rotated counterclockwise around the longitudinal direction as a center to unscrew the first screw section 42 from the screw hole 26. At this time, since the above-mentioned relationship (distance L1<length L2) is set, the second screw section 44 gets stuck with the edge of the screw hole 36 on the side of the first cover 20 before the first screw section 42 comes off the screw hole 26 merely by rotating the fastener 40 counterclockwise. Therefore, in the unscrewing work, the second cover 30 is moved away from the first cover 20 while rotating the fastener 40 counterclockwise to unscrew the first screw section 42 completely from the screw hole 26. After that, the fastener 40 is rotated clockwise around the longitudinal direction as a center to screw the second screw section 44 into the screw hole 36 to unscrew the second screw section 44 from the screw hole 36. Thus, the fastener 40 is disengaged completely from the first cover 20 and the second cover 30.

Referring next to FIG. 4, a manufacturing method for the structure 10, that is, a method of fastening the first cover 20 and the second cover 30 together by the fastener 40 to manufacture the structure 10 will be described. First, as illustrated in FIG. 4A, the second cover 30 and the fastener 40 are prepared, and the fastener 40 is positioned right above the screw hole 36 of the second cover 30. Next, as illustrated in FIG. 4B, the first screw section 42 of the fastener 40 is inserted downward into the screw hole 36 and the second screw section 44 is screwed into the screw hole 36. Using the head 48, the second screw section 44 is inserted into the screw hole 36 while being turned in the counterclockwise direction (first direction) to screw the second screw section 44 into the screw hole 36. Then, as illustrated in FIG. 4C, the second screw section 44 is let out of the screw hole 36 downward to locate at least part of the neck 46 in the screw hole 36. In this state, since the head 48 sits on the bottom wall 39 of the counterbore 34, the fastener 40 never completely drops off the screw hole 36 downward.

Figure 4A:
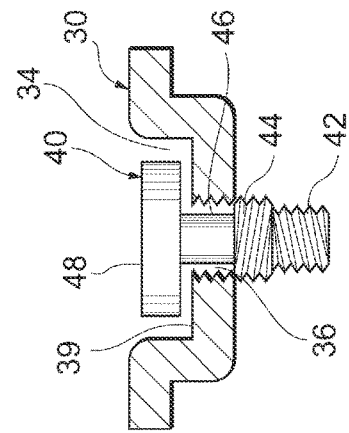
FIG. 4A-4F schematically illustrate a series of flow steps of a method of manufacturing the structure in FIG. 1.
Figure 4B:
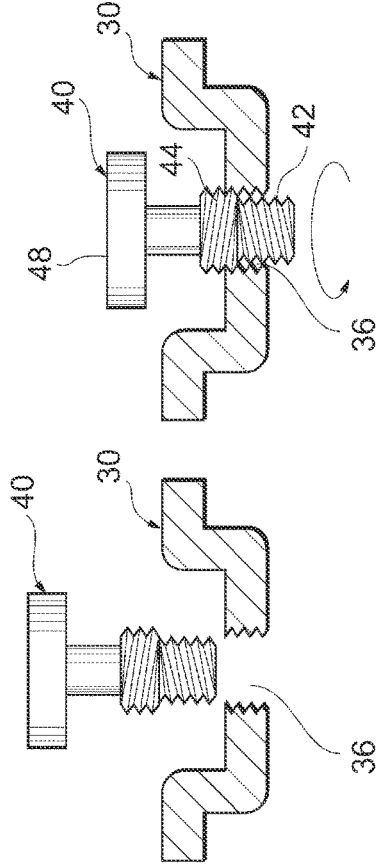
Figure 4C:
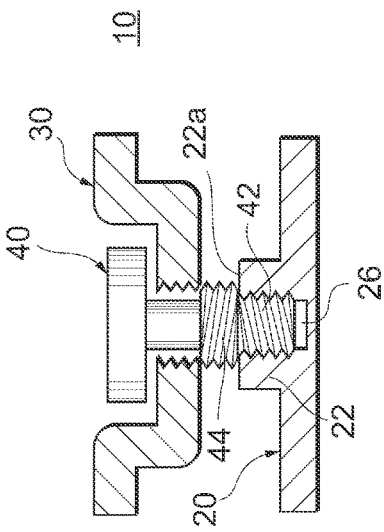
Figure 4D:
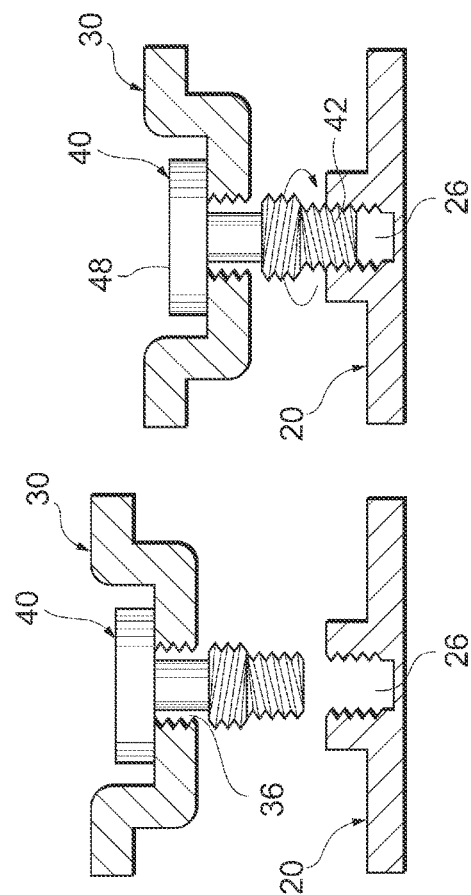
Figure 4E:
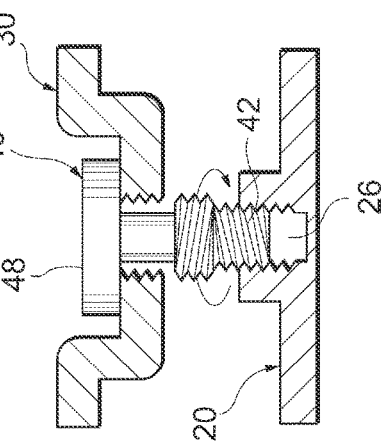
Figure 4F:
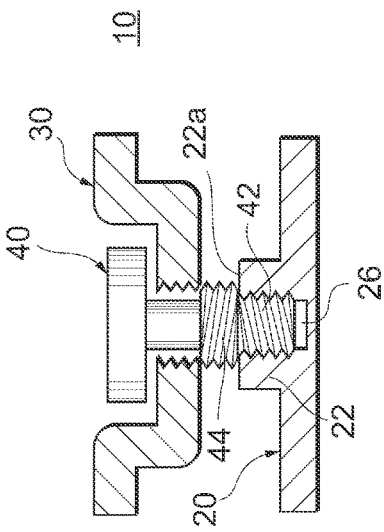

Next, as illustrated in FIG. 4D, the first cover 20 is prepared to align the screw hole 26 of the first cover 20 coaxially with the screw hole 36 of the second cover 30. Then, as illustrated in FIG. 4E, the first screw section 42 is screwed into the screw hole 26, and using the head 48, the first screw section 42 is inserted into the screw hole 26 while being turned in the clockwise direction (the direction opposite to the first direction) to screw the first screw section 42 into the screw hole 26. Eventually, as illustrated in FIG. 4F, the first screw section 42 is fastened to the screw hole 26 into a predetermined fastening state. At this time, the first screw section 42 may be screwed into the screw hole 26 until the end face of the second screw section 44 on the side of the first screw section 42 comes into contact with an upper face 22a of the fitting portion 22. Alternatively, as illustrated in FIG. 3A, the first screw section 42 may be screwed into the screw hole 26 until the head 48 comes into contact with the bottom wall 39 of the counterbore 34.

According to the embodiment described above, in a state where the first cover 20 and the second cover 30 are fastened together by the fastener 40 (see FIG. 3A or FIG. 4F), the first screw section 42 is fastened to the screw hole 26, the second screw section 44 is located between the first cover 20 and the second cover 30, and at least part of the neck 46 is located in the screw hole 36. In this state, even if a turning force in a direction to come off the screw hole 36 (the counterclockwise direction) acts on the first screw section 42 to cause the fastener 40 to move in a direction away from the first cover 20, the second screw section 44 will get stuck with the edge of the screw hole 36 to inhibit the fastener 40 from moving in a direction further away from the first cover 20. In other words, the fastener 40 is retained in a free state not to come off the first cover 20 and the second cover 30. Especially, since the above-mentioned relationship (distance L1<length L2) is set, part of the first screw section 42 remains fastened to the screw hole 26 when the second screw section 44 gets stuck with the edge of the screw hole 36. Thus, the fastening state by the fastener 40 is maintained without fail. On the contrary, even if a turning force in a fastening direction (the clockwise direction) acts on the first screw section 42, the first screw section 42 will be fastened to the screw hole 26. Therefore, the fastening state by the fastener 40 is maintained after all. Thus, according to the embodiment, the fastener 40 can be used alone without using any washer to keep the fitting of the first cover 20 and the second cover 30 after being fastened together.

The fastener 40 is formed to include the first screw section 42 as the right-handed male screw and the second screw section 44 as the left-handed male screw. Therefore, when the fastener 40 is detached, the direction to turn the fastener 40 first is the same as the detaching direction of a standard screw. This can promote detachment work without giving a worker a feeling of strangeness. Note that the relationship of the right-handed screw and the left-handed screw can be reversed between the first screw section 42 and the second screw section 44 in any other embodiment.

Further, a screw recess is formed in the head 48 to rotate the fastener 40 around the axial direction, thus forming the fastener 40 as a screw. This can make it easy to fit the first cover 20 and the second cover 30 to each other by the fastener 40 without the need for a wide space, compared with a case where the fastener 40 is formed into a bolt-like shape. Note that the fastener 40 can be formed as a bolt in any other embodiment. In this case, for example, the head 48 may be formed into a hexagonal shape in cross section, or a hexagonal recess may be formed in the top face 49 of the head 48.

The embodiment of the present invention has been described above with reference to the specific examples. However, the above specific examples are just illustrative examples to describe the present invention, and the present invention is not limited to the embodiment alone. Note that any other form to which a person skilled in the art adds a design change in these specific examples shall be included in the scope of the present invention as long as the form has the features of the present invention. For example, each element included in each of the above specific examples, and the arrangement, material, shape, size, and the like of the element can be changed appropriately without being limited to those illustrated in the specific example.

For example, the cross-sectional shapes of the neck 46 and the head 48 of the fastener 40 are not limited to the round shapes, and any other shape such as a rectangular shape may be adopted. Further, the electronic apparatus is not limited to the laptop personal computer, and the electronic apparatus may be any one of various types of computers, such as a desktop type computer or a tablet type computer. In addition, the two members fastened by the fastener 40 are not limited to the first cover 20 and the second cover 30 of the electronic apparatus. In other words, the fastener 40 can also be used in a structure unrelated to an electronic apparatus.

The invention claimed is:

1. A structure comprising:
    a first member having a first screw hole;
    a second member facing the first member and having a second screw hole larger in diameter than a diameter of the first screw hole, wherein the second screw hole is threaded in a direction opposite to a threaded direction of the first screw hole; and
    a fastener,
    wherein the fastener comprises, along a longitudinal direction:
        a first screw section having a diameter corresponding to the first screw hole;
        a second screw section between the first member and the second member, having a diameter corresponding to the second screw hole, and threaded in a direction opposite to a threaded direction of the first screw section;
        a neck having at least a part located in the second screw hole; and
        a head larger in diameter than the diameter of the second screw hole.

2. The structure according to claim 1, wherein a length of the first screw section, in the longitudinal direction, is longer than a distance between the second screw section and the second screw hole, in the longitudinal direction.

3. The structure according to claim 1, wherein:
    the first screw section is a right-handed male screw, and
    the second screw section is a left-handed male screw.

4. The structure according to claim 1, wherein:
    the fastener is a screw, and
    a screw recess is in the head to rotate the fastener around a longitudinal axis.

5. A manufacturing method for a structure, comprising:
    a first member having a first screw hole;
    a second member facing the first member, having a second screw hole larger in diameter than the first screw hole, and threaded in a direction opposite to the first screw hole; and
    a fastener including, along a longitudinal direction, a first screw section having a diameter corresponding to the first screw hole; a second screw section having a diameter corresponding to the second screw hole, and threaded in a direction opposite to a threaded direction of the first screw section; a neck that is shorter in length than a length of the second screw hole; and a head that is larger in diameter than the diameter of the second screw hole, the method comprising:
    using the head turned in a first direction to insert the second screw section into the second screw hole so as to go out of the second screw hole in order to locate at least part of the neck in the second screw hole; and
    using the head turned in a direction opposite to the first direction to insert the first screw section into the first screw hole so as to fasten the first screw section to the first screw hole.

6. The manufacturing method for the structure according to claim 5, wherein a length of the first screw section, in the longitudinal direction, is longer than a distance between the second screw section and the second screw hole, after the first screw section is fastened to the first screw hole.

7. A fastener which fastens a first member and a second member together, where the first member has a first screw hole, and the second member faces the first member and has a second screw hole larger in diameter than a diameter of the first screw hole and is threaded in a direction opposite to a threaded direction of the first screw hole, the fastener comprising, along a longitudinal direction:
    a first screw section having a diameter corresponding to the first screw hole;
    a second screw section having a diameter corresponding to the second screw hole and threaded in a direction opposite to a threaded direction of the first screw section, the second screw section being located between the first member and the second member when the first member and the second member are fastened together;
    a neck having at least part located in the second screw hole when the first member and the second member are fastened together; and
    a head that is larger in diameter than a diameter of the second screw hole.

8. The fastener according to claim 7, wherein a length of the first screw section, in the longitudinal direction, is longer than a distance between the second screw section and the second screw hole, in the longitudinal direction, when the first member and the second member are fastened together.

* * * * *